(No Model.)
B. W. DUNN.
CHRONOMETRIC APPARATUS.
No. 572,699. Patented Dec. 8, 1896.
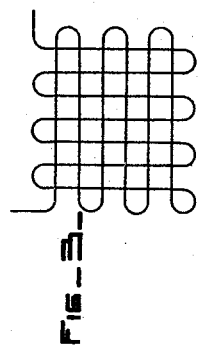
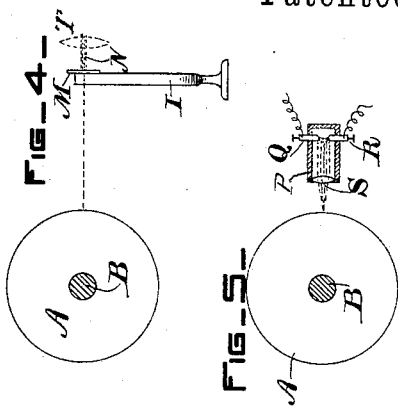
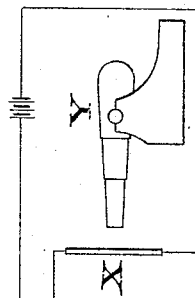
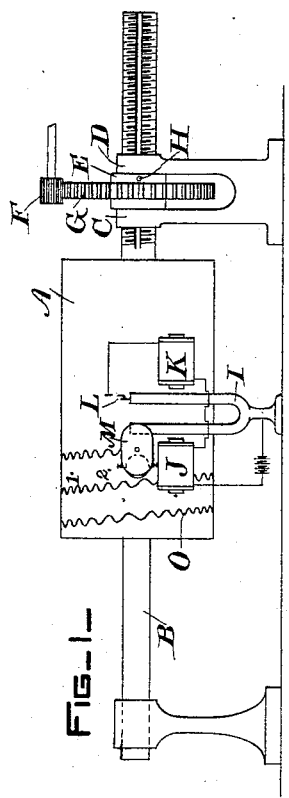
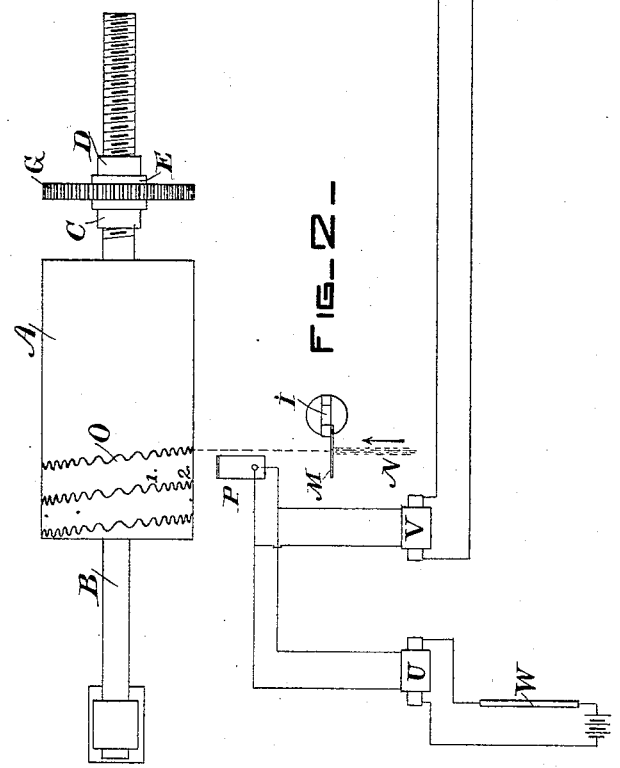
WITNESSES
INVENTOR
Beverly W. Dunn
by Bentley & Blodgett
Attys.

UNITED STATES PATENT OFFICE.

BEVERLY W. DUNN, OF THE UNITED STATES ARMY.

CHRONOMETRIC APPARATUS.

SPECIFICATION forming part of Letters Patent No. 572,699, dated December 8, 1896.

Application filed January 25, 1892. Serial No. 419,136. (No model.)

*To all whom it may concern:*

Be it known that I, BEVERLY W. DUNN, a citizen of the United States, of the United States Army, have invented certain new and useful Improvements in Chronometric Apparatus, of which the following is a specification.

My invention relates to apparatus for measuring minute intervals of time, such, for instance, as is required for a projectile to complete the whole or a definite part of its flight.

The apparatus consists of a photographic receiver, such, for instance, as a rotating cylinder covered with sensitive paper, in front of which a vibratory body, such as a tuning-fork, is placed, and provided with a screen controlling the admission of a ray of light to the cylinder, so that as the fork vibrates a waving line is traced on the cylinder by the action of the said ray.

A second recording apparatus, adapted to act upon the same receiver, consists of a tube containing two contact-points and directed against the surface of the cylinder immediately adjacent to the point at which the light-ray is acting. The contact-points in the cylinder are connected with the secondaries of two induction-coils, the primaries of the coils being in circuits extending, respectively, to points where they may be broken at the beginning and end of the interval to be measured, respectively, as, for instance, to screens adapted to be pierced by a projectile, one being placed immediately at the muzzle of the gun and the other at a definite distance therefrom, but in the path of the projectile, so that as the screens are perforated in succession and the respective circuits thereby broken successively two corresponding sparks will be produced in the tube and the light therefrom directed against the rotating cylinder, so as to produce a record on the cylinder at a point adjacent to the waving line described above of the beginning and end of the projectile's flight.

Referring to the accompanying drawings, illustrating my invention, Figure 1 is a side elevation thereof. Fig. 2 is a plan with a diagram of the circuits. Fig. 3 illustrates the screen adapted to be perforated by the projectile. Figs. 4 and 5 are transverse sections illustrating, respectively, the manner of producing the respective photographic records.

Referring to Fig. 1, A is a rotating cylinder covered with sensitive paper, it being understood that the whole apparatus is to be operated in a dark room, with means for admitting a single ray of light, as hereinafter described. The cylinder A is mounted on a shaft B, which both rotates and moves longitudinally at the same time. This movement of the cylinder may be accomplished by any suitable mechanism. For instance, I have shown the shaft B as screw-threaded and slotted at one end and passed through two threaded bearings C and D. Between these two bearings is a smooth nut E, adapted to be rotated by means of a power-driven pinion F, engaging with a gear-wheel G upon the nut E. The nut has also a pin H, engaging with the slot in the shaft. By this means as the nut E is driven it rotates shaft B, which at the same time is screwed along by the engagement of the thread in the bearings C and D.

It is to be understood that any other suitable mechanism for producing a rotary and longitudinal movement of the cylinder may be employed.

I is a tuning-fork adapted to be put into vibration by two electromagnets J and K, which are included in the same circuit, which circuit is automatically closed and broken by contact L, controlled by the tuning-fork after the manner of a rheotome. One leg of the tuning-fork carries a small paper screen M, through the center of which is a small opening. A ray of light N is directed against this screen, which vibrates with the fork, so that at no part of its vibration does its central perforation pass out of the path of the ray, and in consequence a fine ray of light constantly passes through the opening and falling upon the cylinder traces thereon a waving line O, as is indicated in Figs. 1 and 2.

It will be understood that the vibrations of the tuning-fork produce absolutely equal divisions of time, so that the recorded waving line gives an absolutely correct division of the surface of the cylinder into spaces corresponding to the distance traversed by any point of the surface during a single vibration of the fork, and it will be apparent that if a second record should be produced on the cylinder in a line parallel to the first, corresponding to the beginning and end of the interval of time to be measured, the duration of that interval can be accurately determined in terms of the time of vibration of the fork as a unit, and since the time of vibration can be easily determined for any given fork the measurement of the interval is readily and accurately made. This second record may be produced in any desired manner, but is preferably made by causing a ray of light to act on the cylinder for an instant at the beginning and end of the interval to be measured. In the drawings I have illustrated this record as taken from the flight of a projectile, means being provided for producing an electric spark, which acts on the cylinder at the instant of beginning and end of that part of the projectile's path over which its time of flight is to be measured.

Referring again to the drawings, P represents a tube having its axis directed against the cylinder A at a point adjacent to and in the same horizontal plane with the point of impact of the light-ray N. I have shown the tube P as provided with a lens S to concentrate the light of the spark at a point on the cylinder; but I may use a simple screen with an opening such as I have shown attached to the tuning-fork. On the other hand, I may use a lens with the ray controlled by the tuning-fork, such lens being placed at the proper focal distance. Such a lens is indicated in dotted lines at T, Fig. 4. At the rear end of tube P are shown two electric terminals Q and R, which are connected to the secondaries of the two induction-coils U and V, or I may have two sets of contacts connected to the two secondaries, respectively, so that the circuits will be entirely distinct.

The two primaries of the induction-coils have connected in their circuits, respectively, the two screens W and X, one placed at the muzzle of the gun Y and the other at a known distance therefrom. These screens are of well-known construction, and, as indicated in Fig. 3, consist of a continuous wire included in the electric circuit, wound back and forth upon itself, so as to form a network that may be perforated at some point by the projectile, and the circuit will certainly be broken at whatever point the projectile may strike.

It will be apparent that a projectile starting from the gun Y will interrupt the primary of coil V at the instant of starting, and at a succeeding period of time will interrupt the primary circuit of coil U. The result will be that corresponding sparks will be produced at the contacts Q and R at successive periods, which sparks will give a record on the surface of the cylinder, as, for instance, at the points 1 and 2, Fig. 2, and when the record is made it will be easy to determine by measurement the number of waves in the line O between the points 1 and 2. This will give the number of vibrations of the tuning-fork which have taken place in the interval of time occupied by the flight of the projectile, and the number of vibrations being known it will be easy to determine the actual time, as the vibrations per second of the fork are readily ascertained.

I am aware that by similar apparatus a mechanical record has been made, both of a vibrating body and interval of time, but such have been found in practice ineffective, and I have therefore arranged to produce these records photographically, as described above.

I am also aware that by means of electromagnets a comparative record of a standard-time clock and a clock to be regulated have been made on a common revolving cylinder; but it is the special object of my invention to avoid the use of electromagnets as a part of the apparatus through which measurements are to be recorded, since in the accurate work which I intend to do the inertia of the armature and the magnet is an element that is fatal to success. I therefore desire specifically to limit my invention to the photographic-recording method and apparatus described.

I am also aware that in astronomical observations it is not new to photograph two bodies upon the same plate at successive periods in order to ascertain their relative movements. In such cases the periods at which observations are taken are timed by a chronometer and automatic circuit-closing device, and in no instance, prior to my invention, has there been made a standard photographic record independent of all mechanical or personal errors with which a second photographic record equally independent of mechanical and personal errors is to be compared.

It will be apparent, moreover, that any other interval of time than that of the flight of a projectile may be measured by arranging in any suitable manner to produce the necessary record at the beginning and the end of the interval.

What I claim as new, and desire to secure by Letters Patent, is—

1. The combination with a photographic receiver, such as a cylinder having a rotary and longitudinal movement, a tuning-fork having a perforated screen in the path of a ray of light, means for vibrating the said fork and a recording apparatus acting upon the same receiver for indicating the beginning and end of the interval of time to be measured.

2. The combination with a photographic receiver, means for indicating thereon absolute divisions of time such as are made by a vibrating body, and a recording apparatus directing a ray of light on the said receiver, means for producing a ray of light in said recording apparatus at the beginning and end of the interval of time to be measured.

3. The combination with a photographic receiver of means indicating thereon absolute divisions of time such as are made by a vibrating body, and a recording apparatus consisting of a tube, electric terminals therein in connection with secondaries of an induction-coil, and circuit-controllers corresponding to the beginning and end of an interval of time to be measured, whereby an electric spark is produced in said recording apparatus at the said periods.

In witness whereof I have hereunto set my hand this 19th day of January, 1892.

B. W. DUNN.

Witnesses:
H. M. CORY,
CHAS. A. GREGG.